Figure 1:
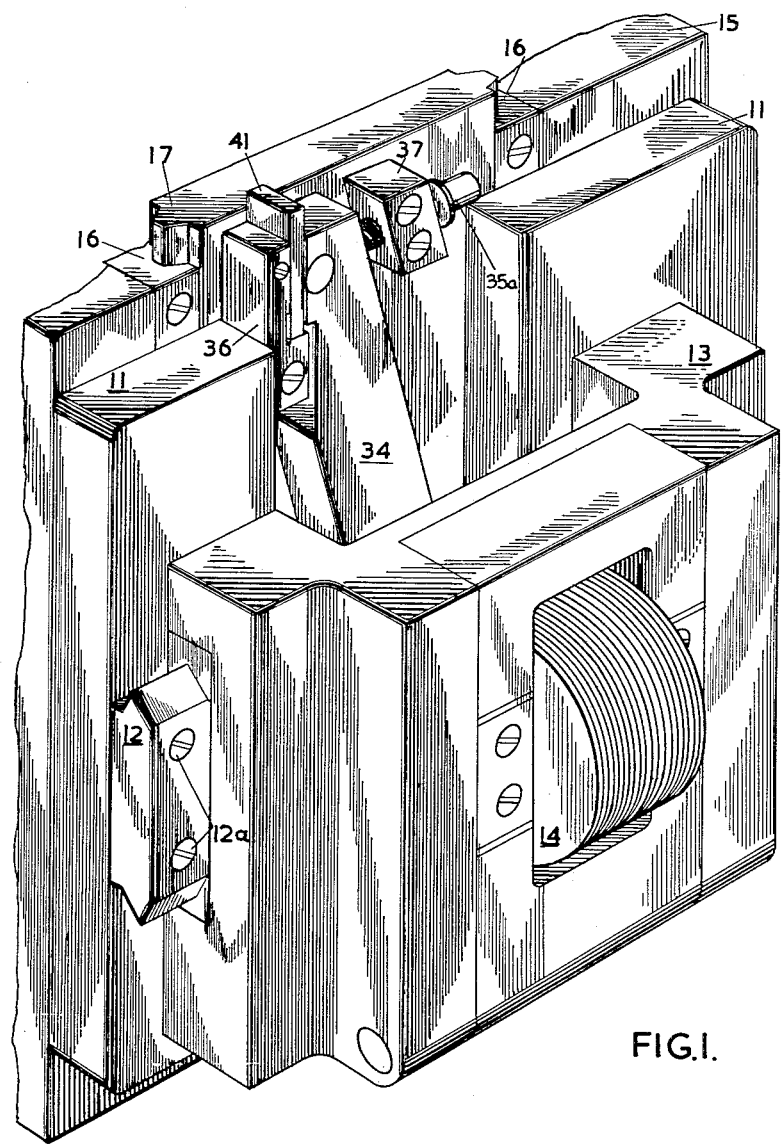

United States Patent Office 2,720,791
Patented Oct. 18, 1955

2,720,791

DRIVE MEANS FOR A RECIPROCATORY MEMBER

Walter Darby, Coventry, England, assignor to Stuart Davis Limited, Coventry, England Application March 9, 1954, Serial No. 415,023

Claims priority, application Great Britain March 24, 1953

4 Claims. (Cl. 74—56)

The invention relates to a drive means for a reciprocatory member (for example, a slide or spindle of a machine tool), and the object is to provide a novel means to drive the reciprocatory member in at least one direction.

According to the invention, the drive means includes an element which is driven to reciprocate in a direction transverse to that of the reciprocatory member and which has a sine-bar for reacting on the reciprocatory member to move it in at least one direction. The aforesaid element could itself be a slide which is driven in any suitable manner from a rotary member and, in the case where the reciprocatory member is to be driven at a uniform speed, the rotary member can be a cam of suitable form, or a toothed quadrant (in which case the element will be provided with coacting rack teeth), and in this way the uniform motion imparted to the element will be transmitted, through the sine-bar, to the reciprocatory member.

According to a further feature, the sine-bar is mounted to be angularly adjustable on the element whereby to enable the amplitude of the movement imparted to the reciprocatory member to be varied.

Figure 2:
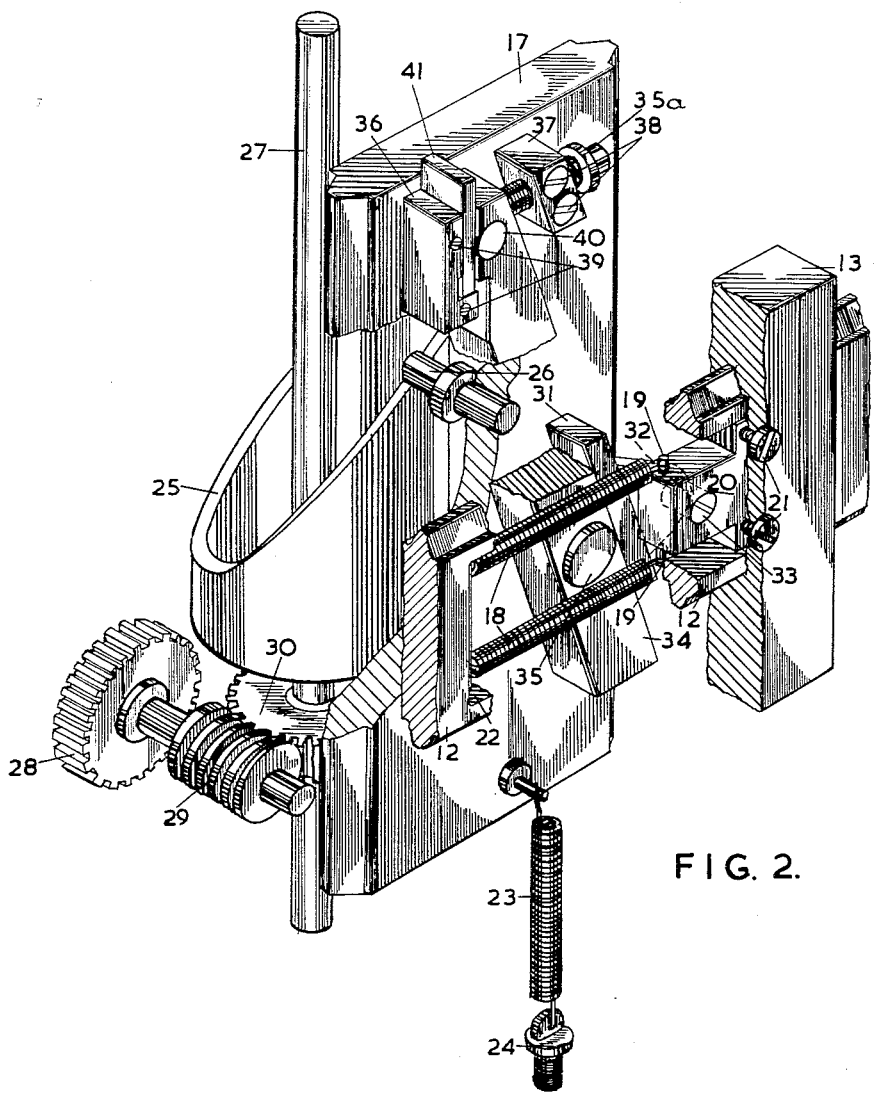

In the drawings:

Figure 1 is a perspective view of a portion of a machine embodying an annularly-ribbed crushing roller for forming, or dressing, a helical thread of a grinding wheel (not shown), various parts which are not essential to an understanding of the invention being omitted; and Figure 2 is a similar view of portions of the machine which are obscured in Figure 1.

The portion of the machine shown includes stationary parts 11, 11 to which is secured, as by screws 12a, a guide 12 for a cross-slide 13 carrying the crushing roller 14. There is also another stationary portion 15 of the machine to which are secured a pair of guides 16, 16, at right-angles to the guide 12, for a reciprocable element shown at 17.

As shown by Figure 2, the cross-slide 13 is biassed to the left of the figure by a pair of tension springs 18, 18 arranged in a central opening 22 of the guide 12, the one ends of the springs being anchored at 19, 19 to a block 20 which is fixed, as by screws 21, 21 to the slide 13 within one end of the opening 22, and the other ends of the springs being anchored to the guide 12 at the other end of the said opening.

Also, as shown by Figure 2, the element 17 is biassed downwardly by a tension spring 23 having a connector 24 for engagement with a stationary part, and the element is raised against the effort of the spring 23 by an edge cam 25 acting on a follower 26 fixed to the element. This cam is fixed to a shaft 27 which is to be continuously rotated from a driven gear wheel 28 through a worm 29 and worm wheel 30.

At the side adjacent the element 17, there is a shoe 31 having a lug 32 by which it is pivoted at 33 to the block 20. This shoe coacts with a sine-bar 34 which has, at the bottom, a pivotal connection 35 with the element 17 and, at the top, is held by a screw 35a against an abutment 36.

The screw 35a works in a threaded bore of a block 37 secured, as by screws 38, to the adjacent side of the element 17, and the abutment 36 is similarly secured to the element 17 by screws 39. Near the top of the sine-bar is a laterally-extending, cylindrical, bearing member 40, and by inserting a selected gauge piece 41 between this bearing member and the abutment 36 the angle of the sine-bar can be adjusted.

In operation, and with the sine-bar adjusted to be at a suitable angle, rotation of the cam 25 raises the element 17 against the action of the spring 23, and the shoe 31, being held by the springs 18 against the sine-bar transmits a desired traversing movement to the cross-slide 13 (i. e., towards the right of Figure 2), the return movement of the slide 13 being accomplished by the springs 18 when the cam allows the spring 23 to move the element 17 downwardly to cause the zone of contact between the sine-bar and shoe to move towards the left.

The pivot 33 enables the shoe 31 to tilt appropriately when the angle of the sine-bar is adjusted.

It will be seen that by adjusting the angle of the sine-bar (i. e., by substituting gauge pieces 41 of different thicknesses), the stroke of the crushing roller can be made to be a desired proportion of the stroke of the element 17 with a resultant variation in the speed of traverse of the crushing roller (e. g., for crushing or dressing threads of different pitches).

What I claim as my invention and desire to secure by Letters Patent of the United States is:

1. In combination, a hollow reciprocatory member, a stationary guide bar supporting the interior of the reciprocatory member and having an opening in it, a spring means disposed in said opening to act substantially in the direction of reciprocation and connected at one end of the opening to the guide bar, a block fixed to the reciprocatory member towards the other end of said opening and acted upon by said spring means, a shoe which is outside the reciprocatory member and pivotally mounted on said block, a sine-bar onto which said shoe is pressed by said spring means, said sine-bar being carried by an element which is guided to reciprocate in a direction transverse to that of the reciprocatory member, said sine-bar being pivotally mounted on said element near one end and adjustably held near the other end, said holding means including an abutment fixed to said element, a replaceable gauge plate carried by said element, a cylindrical bearing carried by the sine-bar to engage the face of said gauge plate, and screw means pressing these parts together, spring means biasing said element in one direction, and a rotatable edge cam for driving said element in the other direction.

2. In combination, a reciprocatory member, a stationary guide bar supporting the reciprocatory member and having an opening in it, a spring means disposed in said opening to act substantially in the direction of reciprocation and connected at one end of the opening to the guide bar, a block fixed to the reciprocatory member towards the other end of said opening and acted upon by said spring means, a shoe which is outside the reciprocatory member and pivotally mounted on said block, a sine-bar onto which said shoe is pressed by said spring means, said sine-bar being carried by an element which is guided to reciprocate in a direction transverse to that of the reciprocatory member, said sine-bar being pivotally mounted on said element near one end and adjustably held near the other end, and means for reciprocating said element.

3. In combination, a hollow reciprocatory member, a stationary guide bar extending into the hollow portion of the member for supporting the member, a block fixed to the member, spring means having one end connected to the guide bar and the other end connected to the block for biasing the member in one direction, a reciprocatory element, guide means for guiding said element in a direction transverse to that of said member, a sine-bar pivotally mounted on said element near one end of the sine-bar, a shoe pivotally mounted on said block and pressed against the pivoted end of said sine-bar by said spring means, means for adjustably holding the sine-bar near its other end comprising an abutment fixed to said element, a cylindrical bearing carried by the sine-bar, a replaceable gauge plate interposed between said abutment and said bearing, and screw means pressing said bearing against said gauge plate, second spring means biasing said element in one direction, and a rotatable edge cam for driving said element in the other direction and carrying said sine-bar therewith to cam said shoe and cause said member to move in the direction opposite to that in which it is biased by the first spring means.

4. In combination, a reciprocatory member, a stationary guide bar supporting said member and having an opening therein, a block within said opening adjacent one end thereof and fixed to said member, spring means within said opening and having one end connected to said guide bar adjacent the other end of the opening and its other end connected to the block for biasing the member in one direction, a reciprocatory element, guide means for guiding said element in a direction transverse to that of said member, a sine-bar pivotally mounted on said element near one end of the sine-bar and adjustably held near its other end, a shoe pivotally mounted on said block outside of said member and pressed against said sine-bar by said spring means, and means for reciprocating said element and sine-bar to cause the sine-bar to cam said shoe and thereby to move said member in the direction opposite to that in which it is biased by the spring means.

References Cited in the file of this patent

UNITED STATES PATENTS

| | | |
|---|---|---|
| 980,506 | Ewertz | Jan. 3, 1911 |
| 1,771,907 | Abramson | July 29, 1930 |
| 2,087,957 | Pelphrey | July 27, 1937 |
| 2,268,342 | Osplack | Dec. 30, 1941 |
| 2,432,161 | Johnston | Dec. 9, 1947 |
| 2,511,443 | McDowell | June 13, 1950 |